United States Patent [19]

Brackner

[11] Patent Number: 4,517,099

[45] Date of Patent: May 14, 1985

[54] APPARATUS AND METHOD FOR HANDLING SOLIDS IN LIQUID

[76] Inventor: Raymond A. Breckner, 11360 Granville Ave., Richmond, British Columbia, Canada, V6Y 1R6

[21] Appl. No.: 540,166

[22] Filed: Oct. 7, 1983

[51] Int. Cl.³ .............................................. B01D 21/24
[52] U.S. Cl. ................................... 210/741; 210/744; 210/104; 210/124; 210/138; 406/17
[58] Field of Search ............... 210/123, 124, 127–129, 210/104, 105, 138, 169, 741, 744; 43/6.5; 119/3; 15/3.13; 406/16, 17

[56] References Cited

U.S. PATENT DOCUMENTS

| | | | |
|---|---|---|---|
| 461,192 | 10/1891 | Merrill | 417/122 |
| 666,803 | 1/1901 | Gannon | 417/122 |
| 1,125,319 | 1/1915 | Hewlett | 417/122 |
| 1,411,585 | 4/1922 | Redmond | 417/122 |
| 1,598,558 | 8/1926 | Cohen | 417/122 |
| 1,600,504 | 9/1926 | Halvorsen | 417/122 |
| 1,606,668 | 11/1926 | Rubach | 43/6.5 |
| 2,664,911 | 1/1954 | Thompson et al. | 210/123 |
| 2,666,671 | 1/1954 | Kimmerle | 43/6.5 |
| 2,736,121 | 2/1956 | Kimmerle | 43/6.5 |
| 2,997,345 | 8/1961 | Stahle | 406/14 |
| 3,116,237 | 12/1963 | Fontein et al. | 210/123 |
| 3,287,068 | 11/1966 | Kimmerle | 43/6.5 X |
| 3,583,365 | 6/1971 | Harden | 43/6.5 X |
| 3,614,167 | 10/1971 | Patterson | 406/14 |
| 3,730,647 | 5/1973 | Lonardo | 417/122 |
| 3,871,332 | 3/1975 | Hayashi | 119/3 |
| 3,918,116 | 11/1975 | Valdespino | 15/3.13 |

OTHER PUBLICATIONS

The Kimmerle Vacu-Lift, a bulletin by Mupco Engineering Co., 250 Cannery St., Terminal Island, Calif. published prior to Oct. 7, 1983.

Primary Examiner—John Adee
Attorney, Agent, or Firm—Carver & Co.

[57] ABSTRACT

Apparatus has a receiving chamber subjected to low pressure to receive solid/liquid mixture through inlet valve thereof. The chamber also has outlet valve to discharge the mixture, an admitting valve to raise pressure in the chamber, and quantity sensing structure responsive to predetermined quantity of mixture within the chamber. The inlet valve is positioned above a predetermined upper level of mixture within the chamber, and a riser constrains the mixture to move initially upwardly and then, optionally, downwardly prior to discharging through the inlet valve. The riser is shaped to cause solids that might otherwise tend to rest initially adjacent the inlet valve, when the mixture flow therethrough ceases, to fall under gravity either forwardly through the inlet valve, or backwardly towards mixture within the delivery duct. Time delay structure delays the opening of the admitting valve to raise pressure in the chamber sometime after attaining the predetermined quantity of the mixture, which also delays closing the inlet valve which provides time for solids to clear the inlet valve before closure thereof. The time delay structure uses either a reservoir for a single chamber embodiment, or for a twin chamber embodiment, the remaining chamber serves also as a reservoir. Use of a reservoir or chamber increases the time required for sufficient low pressure to be attained to actuate the admitting valve. Use of twin chambers provides means to receive mixture essentially continuously.

14 Claims, 6 Drawing Figures

APPARATUS AND METHOD FOR HANDLING SOLIDS IN LIQUID

BACKGROUND OF THE INVENTION

1. Field of the invention

The invention relates to an apparatus and method for handling solids carried in a liquid, for example for pumping fish in water from a net or hold of a ship into another receptacle.

2. Prior Art

For many years, fish and other delicate solids such as fruit and vegetables, have been carried in water to facilitate handling and reduce damage thereto. A common problem associated with handling such delicate solids in liquid is that the solids themselves should not pass through the pump or other means moving the liquid. One way of reducing damage to the solids is to draw the solids into a receiving chamber which has been evacuated by a vacuum source, followed by emptying the solids from the chamber by disconnecting the vacuum source, and admitting atmospheric air, or air under pressure, into the chamber to discharge the solids and liquid therefrom. The liquid is usually separated from the solids after discharge, and is returned to the container, or exhausted to waste.

One problem with prior art pumps of this type results from the fact that solids passing through the inlet valve of the chamber are sometimes trapped by the inlet valve when the valve is being closed following admission of additional air into the chamber, usually when the chamber is approaching a full condition. This is particularly prevalent when pumping fish, which are usually elongated and are more prone to interferring with the inlet valve that shorter objects, such as fruit. While small fish effectively can be cut by the inlet valve to permit closure thereof, larger fish restrict the inlet valve against closure, and then it is impossible to evacuate the chamber without first clearing the blocked inlet valve. This requires shutting down the machine, and usually removing an inspection cover to permit manual removal of the trapped fish.

There are many types of fish pumps, some using one chamber, others using two chambers in parallel which are alternately exposed to suction. U.S. Pat. No. 3,871,332 (Hayashi) shows an inlet valve located adjacent a lower portion of the chamber, which location tends to aggravate blocking of the valve with fish due to a hydrostatic head acting on the inlet valve, the head being proportional to depth of the inlet valve below an upper level within the chamber. This patent also discloses a complex electrical control system to control operation of the valves. In other apparatus it is also known to locate the inlet valve adjacent an upper portion of the chamber, thus obviating the problem of the hydrostatic head, but such location is still prone to fish blocking the inlet valve when flow through the inlet valve ceases.

SUMMARY OF THE INVENTION

The invention reduces the disadvantages and difficulties of the prior art by providing an apparatus for handling a solid/liquid mixture in which solids passing through the inlet valve are less liable to be trapped by the inlet valve when flow through the valve ceases and the valve is to be closed. This is attained by locating the inlet valve above a maximum upper level of liquid within the chamber, and ensuring that there is little tendency for solids passing through the inlet valve to rest adjacent the inlet valve when flow of the mixture through the valve ceases. The chance of fish or elongated solids being caught in the valve when it closes are reduced by providing a delay means which sufficient time for flow through the valve to cease, so that any solids are liable to fall freely from the valve under gravity. The invention is also characterized by a simple mechanical/pneumatic control system for controlling the valves, and thus electrically switched valves are eliminated, which tends to simplify servicing.

An apparatus according to the invention is for handling a solid/liquid mixture comprising solids carried in a liquid. The apparatus has a receiving chamber adapted to receive the mixture from a delivery duct and to hold the mixture temporarily, the chamber communicating with a low air pressure source or a vacuum source through a main directional valve. The chamber has an inlet valve communicating with the delivery duct to receive the mixture, an outlet valve to discharge the mixture from the chamber, an admitting valve to raise pressure in the chamber, and a quantity sensing means responsive to a predetermined quantity of mixture within the chamber. The apparatus also includes positioning the inlet valve adjacent an upper portion of the chamber above a maximum upper level of mixture within the chamber, a riser means and a time delay means. The chamber is connectable, as required, to the low pressure source to expose the inlet valve to a pressure difference so as to open the inlet valve and to draw the mixture therethrough. The riser means is positioned upstream of the inlet valve and is adapted to constrain the mixture to move initially upwardly prior to discharging through the inlet valve into the chamber. The riser means is so shaped as to cause solids, that might otherwise tend to rest adjacent the inlet valve when the mixture flow therethrough ceases, to fall under gravity either forwardly through the inlet valve and into the chamber, or backwardly towards the mixture within the delivery duct. The time delay means is responsive to the quantity sensing means to actuate the main directional valve when the predetermined quantity is attained to disconnect the vacuum source from the chamber. Concurrently the mixture is permitted to continue to flow through the inlet valve under a gradually reducing pressure difference, so that flow through the inlet valve eventually ceases at a time when the maximum upper level is attained. This occurs prior to opening of the admitting valve to raise pressure in the chamber the predetermined quantity of mixture. This which in turn closes the inlet valve, so as to provide time for solids to clear the inlet valve before closure thereof.

In a preferred embodiment, a second receiving chamber is adapted to receive the mixture from the delivery duct alternately with the first chamber. The second chamber is generally similar and communicates with the vacuum source through the main directional valve. The second chamber has a similar inlet valve, outlet valve, admitting valve and a quantity sensing means responsive to quantity of liquid within the second chamber. The second chamber is adapted to serve as an air reservoir for the time delay means and the quantity sensing means of the two chambers are coupled together so that each serves as a resetting means of the other, so as to reset the quantity sensing means of the empty chamber prior to refilling the empty chamber.

A method of handling a solid/liquid mixture according to the invention utilises the structure described above and includes the mixture being temporarily stored within the receiving chamber. The chamber has an inlet valve to receive the mixture, an outlet valve to discharge the mixture, an admitting valve to admit air into the chamber, and a quantity sensing means responsive to a predetermined quantity of mixture within the chamber. The method includes steps of positioning the inlet valve adjacent an upper portion of the chamber above a maximum upper level of mixture within the chamber, followed by exposing the chamber to a vacuum to generate a pressure difference across the inlet valve to cause the mixture to move into the chamber. Concurrently with such exposure, the flow of mixture is constrained by a riser means which causes the mixture to move upwardly prior to entering the inlet valve and discharging into chamber. The method also includes disconnecting the vacuum source from the chamber when the amount of mixture within the chamber attains the predetermined quantity, while permitting continuation of the flow of mixture into the chamber. This continuing flow gradually decreases the pressure difference across the inlet valve so that flow through the inlet valve eventually ceases, when a maximum upper level of mixture within the chamber is below the inlet valve. The method also includes opening the admitting valve some time after disconnecting the vacuum source to provide a time delay sufficient to permit any solids coming to rest adjacent the inlet valve, when the mixture flow therethrough ceases, to fall under gravity either forwardly through the inlet valve and into the chamber, or backwardly towards the mixture within the delivery duct. Opening the admitting valve raises pressure in the chamber to permit the inlet valve to close and the outlet valve to open to discharge the mixture from the chamber. Preferably, after disconnecting the chamber from the vacuum source, the vacuum source is connected to a reservoir to initially reduce pressure differential so that additional time is required to increase pressure differential sufficiently to overcome resistance to opening of the admitting valve, thus providing said time delay.

In a preferred method embodiment, the mixture is temporarily stored in at least two chambers, each chamber having a respective inlet valve to receive the mixture, a respective outlet valve to discharge the mixture, a respective admitting valve to admit air into the respective chamber, and a respective quantity sensing means responsive to a predetermined quantity of mixture within the respective chamber. The method is further characterized by actuating the quantity sensing means of the first chamber to indicate that the first chamber contains the predetermined quantity. This is followed by disconnecting the vacuum source from the first chamber and connecting the vacuum source to the second chamber. The inlet, outlet and admitting valves of the second chamber are closed so that the second chamber serves as a reservoir containing air initially at a pressure higher than the pressure of the vacuum source. This is followed by exposing pressure responsive actuating means for the admitting valve of the first chamber to the pressure within the second chamber, which pressure is initially insufficient to overcome resistance to opening the admitting valve of the first chamber. When pressure within the second chamber is sufficient to overcome the resistance to opening of the admitting valve, the admitting valve opens to raise pressure, which is sometime after disconnecting the vacuum to provide the said time delay.

A detailed disclosure following, related to the drawings, describes preferred apparatus and method according to the invention, which however, is capable of expression in apparatus and method other than that particularly described and illustrated.

DETAILED DISCLOSURE

Figure 1:
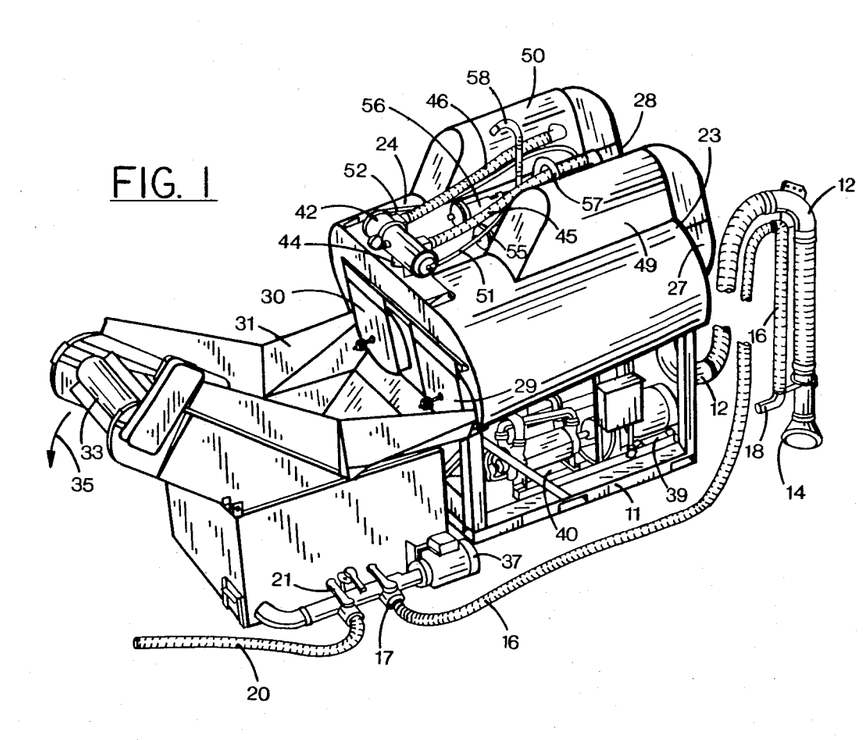
FIG. 1 is a simplified fragmented perspective of the apparatus according to the invention, a main twin chamber portion being shown with associated support structure and accessories, including an outfeed conveyor and delivery and return hoses.

FIG. 1

An apparatus 10 according to the invention has a support 11, and a delivery hose 12 having an intake funnel 14 at an outer end and an inner end connected to the apparatus. The funnel is adapted to be placed inside a fish hold or other container, not shown, containing fish in water, and suction from the apparatus draws the fish and water as a water/fish mixture up the hose 12 and into the apparatus as will be described. A water return line 16 extends from a water return valve 17 at an inner end of the line 16 to a discharge opening 18 at an outer end, which usually returns water separated from the fish back into the hold. A water discharge line 20 extends from a discharge valve 21 at an inner end to dump water to waste as required.

Figure 3:
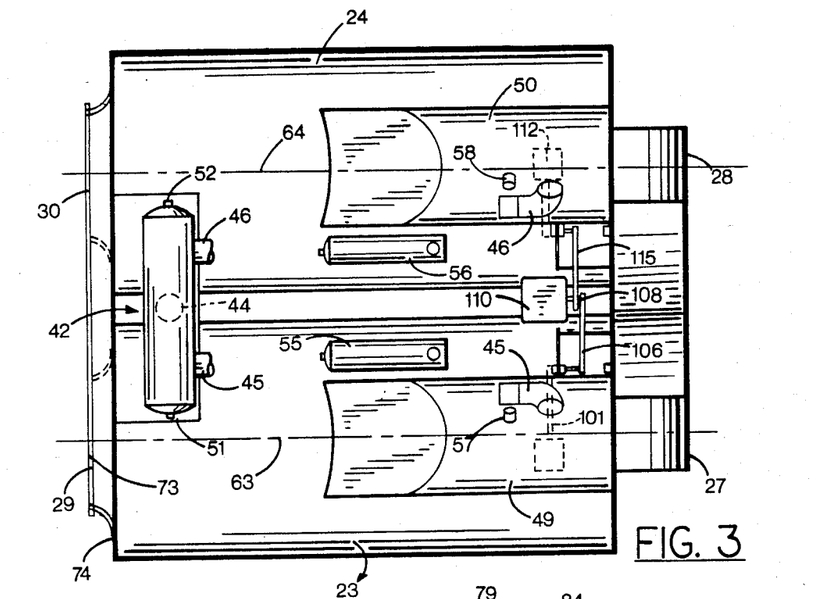
FIG. 3 is a simplified, fragmented top plan of the main portion of the invention as viewed normally to axes of FIG. 2.
Figure 4:
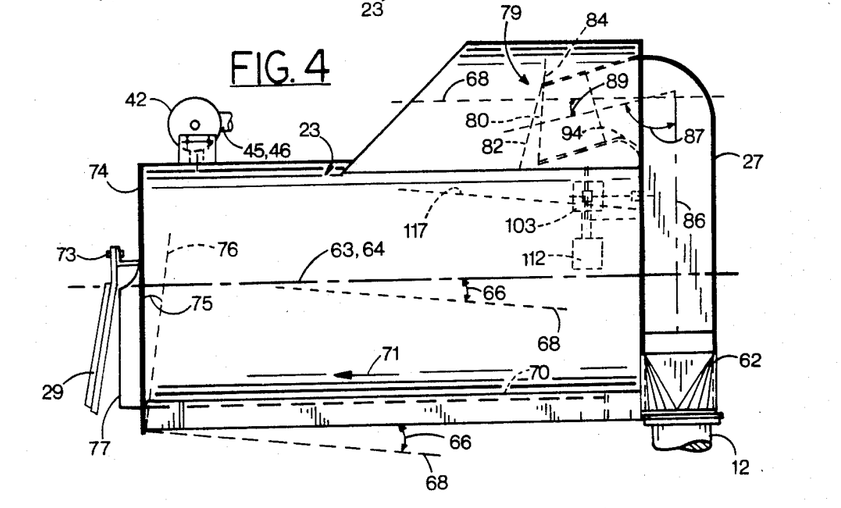
FIG. 4 is a simplified, fragmented side elevation of the main portion of the invention as shown in FIGS. 2 and 3, the axes shown horizontal.

The apparatus 10 has first and second receiving chambers 23 and 24, the chambers being generally cylindrical and disposed so that axes thereof are generally parallel to each other when viewed from above, see FIG. 3, and are inclined to the horizontal when viewed from the side to assist the discharge of material, see FIG. 4. The chamber 23 and 24 have first and second delivery ducts 27 and 28, and first and second outlet valves 29 and 30 respectively, the outlet valves being disposed at a position lower than the delivery ducts so as to discharge mixture under gravity through the outlet valves. The outlet valves discharge mixture into an outlet chute 31 which is inclined downwardly to cooperate with an outfeed conveyor 33, which is perforated to permit water to drain therethrough to be pumped through either the water return valve 17 or the water discharge valve 21 as required. Fish, and a little water, are discharged from an upper end of the outfeed conveyor 33 in direction of an arrow 35 into a waiting conveyance, not shown. A pump motor 37 powers the pump to discharge water through either of the lines 16 or 20, and a motor 39 powers a vacuum pump 40 which applies vacuum to the chambers 23 and 24 as will be described.

A three-way, main directional valve 42 has a vacuum input line 44 and first and second vacuum connecting lines 45 and 46 extending from spaced positions on the valve 44 to upper hoods 49 and 50 of the chambers 23 and 24 respectively. First and second directional pilot lines 51 and 52 extend from a pilot control valve, see FIGS. 2 through 4, to opposite ends of the directional valve 44 as shown. First and second admitting valves 55 and 56 similarly connect with the first and second pilot lines 51 and 52 by short connecting branches, shown only in FIG. 6, and are adapted to admit air into the first and second chambers through first and second admitting conduits 57 and 58 respectively as will be described.

FIGS. 2 through 5

Figure 2:
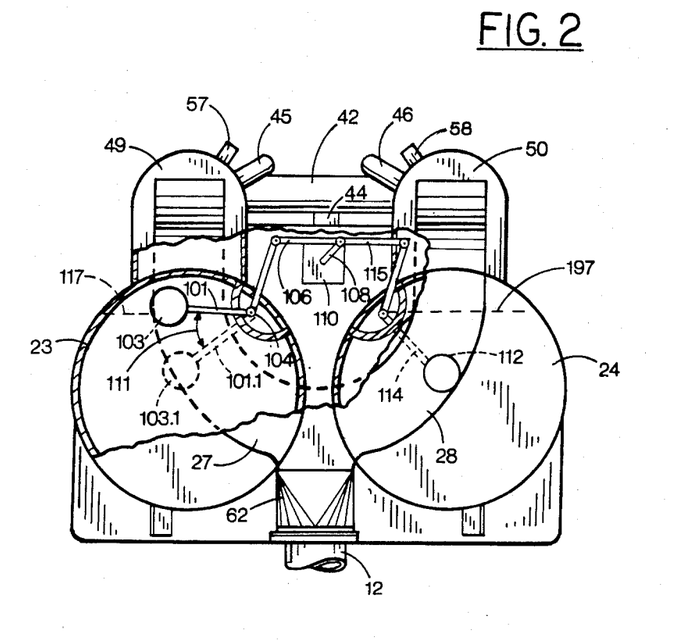
FIG. 2 is a simplified, fragmented, end elevation of the main chamber portion as viewed axially from a bifurcated portion of a delivery duct, some portions being removed for clarity.

As seen in FIG. 2, the delivery hose 12 connects to an inlet conduit coupling 62 from which the first and second delivery ducts 27 and 28 are bifurcated and lead to the first and second hoods 49 and 50. The chambers 23 and 24 have axes of symmetry 63 and 64 respectively which, as seen in FIG. 3, are parallel to each other and, as seen in FIG. 4, are also coplanar and are disposed at an angle 66 to the horizontal, designated 68, when carried on the support 11 of FIG. 1. The angle 66 is sufficient to cause fish to slide along a lower surface 70 of the chamber 23 in direction of an arrow 71 so as to discharge through the first outlet valve 29. The valve 29 is a simple sealed hinged plate valve which is hinged adjacent an upper edge to a hinge 73 mounted adjacent a circular end face 74 of the chamber. The end face 74 is at right angles to the axis 63, and thus the end face is similarly inclined at an angle 75 to the vertical 76. When the outlet valve 29 is closed it is held by suction against a complementary valve seat 77 on the end face 74, and when open hangs freely and generally vertically from the hinge 73 as shown. The outlet valves 29 and 30 are similar.

Figure 5:
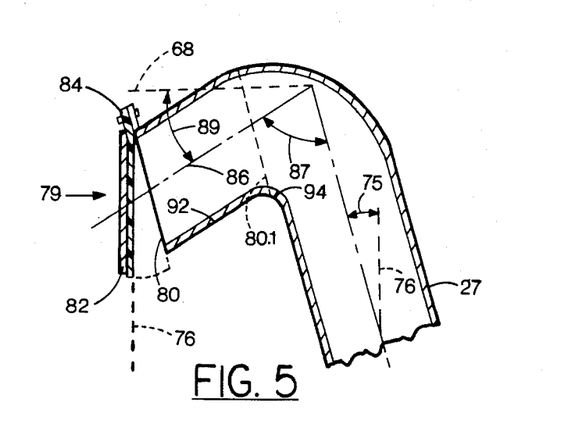
FIG. 5 is a simplified, fragmented, detail side elevation of an inlet valve shown in a true attitude.

Referring to FIGS. 4 and 5, the first delivery duct 27 extends through the hood to an inlet valve seat 80 which is in a plane generally parallel to the end face 74 and thus is inclined to the vertical 76 similarly to the outlet valve 29. The seat 80 is one part of an inlet valve 79, which valve has a complementary valve plate 82 which is hinged adjacent an upper end to a hinge 84. The hinge 84 permits swinging between the open position, shown in FIG. 5, to a closed position where it is drawn tightly against the valve seat 80, so as to seal the delivery duct 27. The duct 27 extends generally upwardly from the inlet conduit coupling 62, and, as best seen in FIG. 5, has a duct axis 86 which swings through an angle 87, about 75°. This results in the duct axis initially passing upwardly at the angle 75 to the vertical 76 and then downwardly at an angle 89, about 25°, to the horizontal. Thus a lower surface 92 of the delivery duct, adjacent the seat 80 is disposed to the horizontal at an angle of approximately 25°. This is important because an angle of this steepness effectively prevents any fish from resting thereon or across the valve seat 80 when flow through the duct 27 ceases, as will be described. The lower surface 92 has a high point or apex 94 positioned upstream from the inlet valve and above the duct 27. The apex 94 forces fish passing up the duct 27 to move initially upwardly up the duct, and then to pass over the apex 94 and downwardly through the inlet valve 79. The disposition of the apex 94 relative to the inlet valve seat 80 is of importance and will be described in greater detail with reference to the operation of the invention. The duct 28 feeds mixture to a similar apex and inlet valve for the chamber 24.

Each receiving chamber has a float assembly which is a portion of a quantity sensing means which is responsive to level of liquid in the chamber as the liquid level approaches a predetermined level. Referring to FIG. 2, the float assembly of the chamber 23 has a generally L-shaped float arm 101 which has a float 103 at one end, and is hinged at 104 for swinging relative to the chamber. The arm 101 has an opposite end carrying a link pin 105 which is hinged to a connecting link 106. The link 106 has an opposite end connected to a control arm 108 of a rotary pilot valve 110. The float and arm can swing between through an angle III, about 30° between raised positions as shown in full outline, and lowered positions 103.1 and 101.1, as shown in broken outline, which swings the pin 105 through a similar angle. The link 106 transfers this movement to the contral arm 108 of the pilot valve for interconnecting ports as will be described, the arm 108 rotating through an angle of 90° in view of relative lengths of the moment arms.

The chamber 24 has a similar second float 112, an L-shaped float arm 114, and a connecting link 115 which is similarly connected to the control arm 108 of the valve. The connecting links 106 and 115 have adjustable length means so that the floats can be adjusted as shown, in FIG. 2 so that when the float 103 is at a maximum raised position, the float 112 is at a maximum lowered position, and vise versa. Note that stops limit downward movement of the float, so that the float stops at a position well above the "empty position" of the chamber. Thus, the float is not fully responsive to a lower level of liquid in the chamber, ie adjacent the bottom of the chamber, but instead becomes responsive when the liquid level exceeds an approximate mid-position of the chamber. The pilot valve 110 has spring-loaded detent means to ensure that the valve is actuated quickly when interconnecting ports. This is required so that the pilot pressure is rapidly directed from one set of valves to an opposite set of valves when the float reaches the predetermined level within the chamber, representing a predetermined quantity of mixture. This predetermined level is shown as a broken line 117 in FIGS. 2 and 3, and represents a predetermined level in the chamber 23 at which time the pilot valve rapidly disconnects one set of ports and connects another set of ports, as will be described with reference to FIG. 6. Referring to FIG. 4, the level 117 is well below the inlet valve 79 because mixture continues to flow into the chamber for a limited time after the pilot valve is actuated, as will be described.

Figure 6:
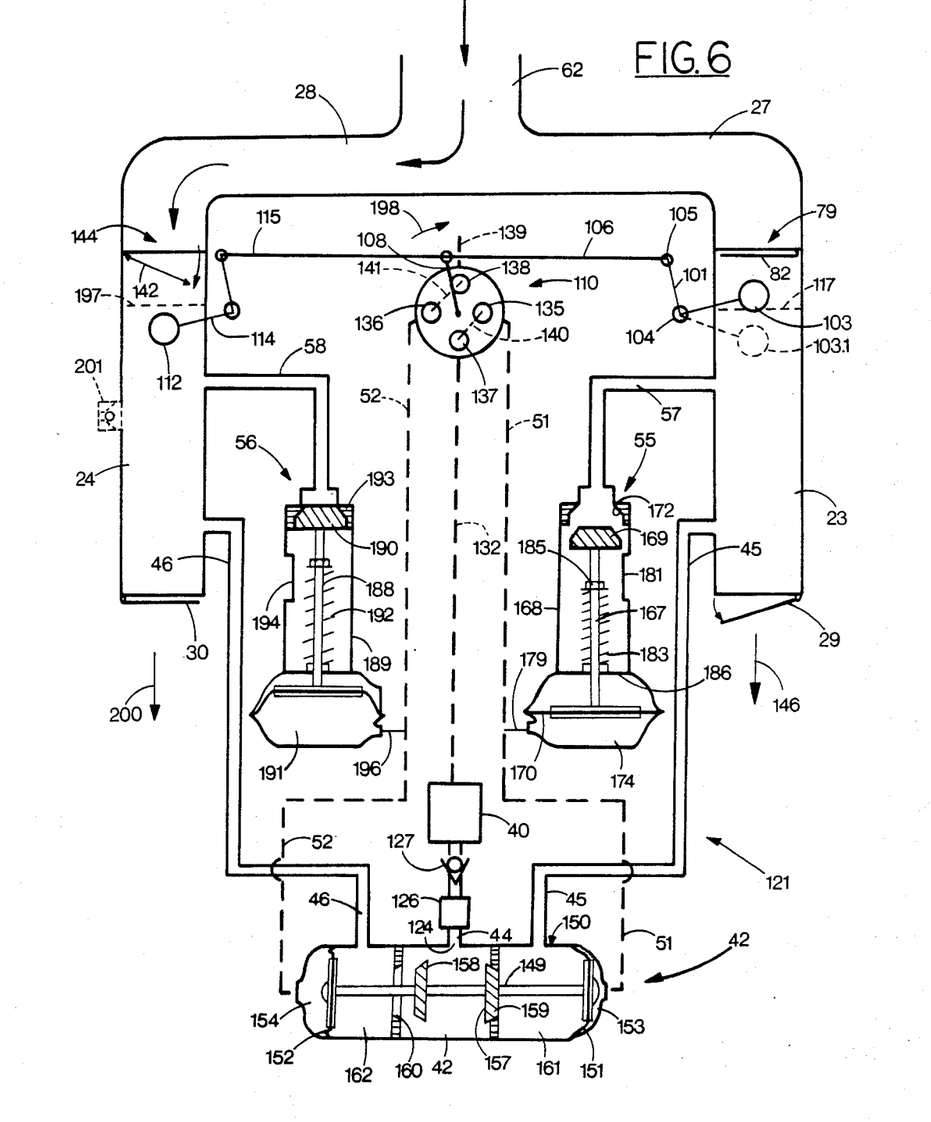
FIG. 6 is a simplified diagramatic representation of valves, an associated low pressure circuit and quantity sensing means cooperating with the valves and the chambers of the invention.

FIG. 6

A pneumatic control circuit 121 is shown cooperating diagramatically with the chambers 23 and 24 which are supplied with mixture through the delivery ducts 27 and 28 respectively through the inlet conduit coupling 62. The main directional valve 42 is shown to have a center port 124 receiving the vacuum input line 44 which passes through a vacuum regulator 126 and a check valve 127, the check valve being appropriate for use with a liquid ring vacuum pump as is known in the trade. A pilot vacuum input line 132 extends from the vacuum pump 40 to the pilot valve 110, which has four ports 135 through 138 as follows. The ports 135 and 136 are output ports which communicate with the first and second directional pilot lines 51 and 52 which extend to opposite ends of the directional valve 42. The port 137 is a vacuum input port which communicates with the pilot vacuum line 132 to provide a low pressure imput, and the port 138 is a vacuum venting port vented through line 139 to atmosphere. In the position shown, a passage 140 in the valve 110 interconnects the ports 135 and 137, and a similar passage 141 interconnects the ports 136 and 138.

FIG. 6 shows diagrammatically the floats and the valves in the conditions similar to those shown in FIGS. 2 through 4, namely the first chamber 23 is shown discharging its load, while the chamber 24 is shown being filled through the duct 28. In this condition, the float 103 is retained in its fully raised position by the spring loaded detent means in the pilot valve 110. The float 103 will be released from the fully raised position when the float 112 attains the predetermined level position. The valve plate 82 in the chamber 23 is shown closed, and a corresponding and similar valve plate 142 of an inlet valve 144 of chamber 24 is shown open. Similarly, the outlet valve 29 of the chamber 23 is shown open discharging its load in direction of arrow 146, and the outlet valve 30 of the chamber 24 is shown closed, being held there under vacuum within the chamber 24.

The main directional valve 42 is a sliding spool valve and is shown simplified and diagramatically and has a valve spool 149 mounted for axial movement within a valve body 150. The spool carries spaced first and second diaphragms 151 and 152 which provide first and second diaphragm chambers 153 and 154, which chambers have ports communicating with the pilot lines 51 and 52 respectively. The spool 149 carries spaced first and second valve members 157 and 158 which cooperate with spaced first and second valve seats 159 and 160 so as to open and close first and second valve chambers 161 and 162 as the spool 149 moves axially. As drawn, the diaphragm chamber 153 is exposed to vacuum through the pilot valve 110, which draws the valve member 157 against the seat 159 to seal the valve chamber 161, and also holds the member 158 off the seat 160 so as to expose the valve chamber 162 to vacuum. The chamber 161 is thus exposed to atmospheric pressure through the first connecting line 45, which communicates with the chamber 23 which is exposed to atmosphere. The second chamber 24 is exposed to the vacuum in the chamber 162 by the connecting line 46. The valve spool 149 is freely mounted so as to respond quickly to pressure differences within the diaphragm chambers 153 and 154, and thus is considered to be a relatively fast response valve. The directional valve 42 is shown to be a three-way spool valve, having two seats or ports which are alternately opened and closed when pilot pressure is applied alternately to diaphragms adjacent opposite ends of the spool. This is one type of directional valve, and clearly other types can be substituted which alternately direct vacuum to the respective chamber as required, in response to actuation of the pilot valve.

The admitting valve 55 has a valve spool 167 mounted for axial sliding in a valve body 168, and carries at one end a valve member 169 and at an opposite end a diaphragm 170. The valve member is shown spaced from a complementary valve seat 172 which communicates with the conduit 57, which in turn opens into the chamber 23. The valve body defines a diaphragm chamber 174 with the diaphragm 170, the chamber having a pilot input port which communicates with the pilot line 51 through a short connecting line 179. The valve body 168 has an atmospheric venting port 181 which, as shown, admits atmospheric pressure into the chamber 23 when the valve member is spaced from the valve seat 172. A compression coil spring 183 extends between an adjustable spring stop 185 carried on the spool 167 and an inner wall 186 of the diaphragm chamber so as to tend to force the valve member 169 against the seat 172 to close the valve. When the diaphragm chamber 174 is exposed to vacuum through the line 179, the spool 167 is moved to open the valve against spring force.

The admitting valve 56 has a similar valve spool 188, a valve body 189, a valve member 190, a spring 192 and diaphragm chamber 191. The valve body 189 carries a valve seat 193 which is complementary to the member 190 and has an atmospheric vent port 194. The diaphragm chamber 191 communicates with the second pilot line 52 through a short connecting line 196, and, because the line 52 is at atmospheric pressure, the spring 192 forces the valve member 190 against the valve seat 193, thus closing the valve 56 and thus closing the line 58 leading to the chamber 24.

In contrast to the directional valve 42, which can be freely shifted by low pressure, the admitting valves 55 and 56 have an adjustable spring force to close the valve, which force must be overcome before the valve opens. Thus, when compared with the valve 42, the admitting valves 55 and 56 are relatively slow response valves which are actuated against a resilient resistance. While the admitting valves are shown to be spring-closed, pilot-pressure opened, two-way diaphragm spool valves, other types of admitting valves can be substituted.

OPERATION

The following description refers mostly to FIG. 6, where the overall system is disclosed, but for greater understanding of details reference should be had to specific figures, in particular FIGS. 2 and 5.

The intake funnel 14 and return discharge opening 18 of FIG. 1 are placed in a tank containing fish and water, and the pumps operate with the pilot valve positioned as seen in FIGS. 2 and 6 with the float 103 in an uppermost position and the inlet valve of the first receiving chamber being closed. Pressure from the vacuum pump 40 is fed via the line 132 and the valve 110 to the diaphragm chamber 153 of the valve 42, which has shifted the valve spool 149 so that the valve member 157 seals the seat 159 and the valve member 158 exposes the seat 160. The second receiving chamber 24 is thus exposed to vacuum through the chamber 162 and the connecting line 46. Because the second pilot line 52 is exposed to atmosphere through the ports 136 and 138, the diaphragm chamber 191 is expanded by the spring 192, which permits the valve member 190 to seal against the valve seat 193, thus closing the vent conduit 58. Spring force closing the valve 56 is augmented by force from low pressure within the conduit 58. The low pressure in the chamber 24 draws fish through the delivery duct 12, into the inlet conduit coupling 62 and then through the second delivery duct 28, and the inlet valve 144 into the chamber 24. The second outlet valve 30 is held against its seat by low pressure within the chamber 24, and the chamber 24 is being filled with the mixture of fish and water.

The diaphragm chamber 174 of the admitting valve 55 is also exposed to low pressure in the line 51, which pressure has moved the spool 167 against force from the spring 183. This movement lifted the valve member 169 off the seat 172, thus opening the valve 55 to expose the conduit 57 to atmosphere through the atmospheric vent port 181. The outlet valve 29 is open when the chamber 23 is at atmospheric pressure, and the fish/water mixture 23 drains through the valve 29 in direction of the arrow 146, while the inlet valve 79 is held closed by low pressure within the duct 27.

The chamber 24 continues to fill until the mixture contacts the float 112 and gradually overcomes resistance to movement of the float 112, which resistance is due to the spring-loaded detent means in the pilot valve 110 which shifts quickly when the force is overcome. This occurs at a level 197 which represents a predetermined quantity of mixture within the chamber to initiate shifting of the valve 110. This is similar to the level 117, shown in FIG. 3 which represents a similar predetermined level for the chamber 23. At the instant that the pilot valve 110 is actuated due to shifting of the control arm 108 in accordance with an arrow 198, the port 138 is now connected to the port 135, and the port 136 is now connected to the port 137. This condition is not shown, nor is the resulting condition of the valves as described below. Thus the pilot line 52 is now instantly exposed to vacuum within the vacuum input line 132, and the pilot line 51 is instantly exposed to atmospheric pressure through the atmospheric port 138. The diaphragm chamber 154 is immediately exposed to vacuum pressure in the line 52, and the valve spool 149 rapidly shifts so that the valve member 158 seats against the seat 160 and the valve member 157 moves away from the seat 159. Thus the vacuum connecting line 46 is suddenly disconnected from the vacuum, and the vacuum line 45 is suddenly connected to the vacuum. Closure of the valve seat 160 prevents additional air entering the line 46, so that the chamber 24 remains sealed and the low pressure in the chamber 24 continues to draw fish through the inlet valve 144. As the mixture continues to enter the chamber 24, pressure within the chamber 24 gradually rises and the level within the chamber rises above the level 197 which originally caused the valve 110 to actuate.

As pressure rises in the chamber 24, pressure differential across the valve 144 is reduced and flow therethrough gradually decreases. The hose 12 contains a moving column of fish/water mixture which has a relatively large momentum which is gradually reduced as the pressure differential reduces. Eventually the moving column stops and has insufficient momentum to pass up the duct 28 and is then supported below the apex by a volume of low pressure air trapped in the duct and the chamber 24. The valve 144 remains open at this time, which is important as will be described, and the duct 27 is also exposed to this low pressure air which draws the plate 82 to close the valve 79 of the chamber 23.

When the valve 42 has shifted as previously described, the line 45 and chamber 23 are exposed to vacuum pump 40 through the chamber 161, and the valve 29 is rapidly closed. The pump 40 is then subjected to the relatively large volume of the air at atmospheric pressure in the empty chamber 23 which acts as a large reservoir and rapidly reduces the effect of the vacuum pump such that the pressure in the whole vacuum circuit rapidly rises. The pump requires several seconds to reduce the pressure of the vacuum circuit plus the chamber 23 to an amount which can actuate the admitting valve 56. The chamber 191 of the valve 56 is exposed to the low pressure within the line 52, and exerts a force on the spool 188 in opposition to that the compression spring 192. The force from the spring is overcome when pressure in the chamber 191 is sufficiently low and the valve member 190 then lifts off the seat 193, thus exposing the admitting conduit 58 to atmosphere through the atmospheric port 194. At that instant, the inlet valve plate 142 snaps shut due to low pressure within the duct 27 which has been generated by supporting the column of fish/water in the hose 12 as previously described. The outlet valve 30 opens essentially concurrently with the closure of the valve 144, permitting the fish/water mixture to drain from the chamber 24 in direction of an arrow 200.

After the valve 110 has shifted in direction of the arrow 198, atmospheric pressure is admitted into the diaphragm chamber 174 of the valve 55, which permits the spring 167 to force the valve member 169 against the seat 172, thus closing the valve 55, which closure is augmented by decrease in pressure within the chamber 23. Pressure continues to decrease in the chamber 23 after the line 45 is exposed to vacuum, and the inlet valve 79 opens when pressure in the chamber 23 is less than pressure in the duct 27. Fish entering the coupling 62 are then drawn into the duct 27, so that operation as described for the chamber 24 is now repeated for the chamber 23. It is noted that the float 103, which was originally in a raised position shown in FIG. 6, has been depressed to the lowered position 103.1 which is equivalent to lowered position of the float 112. Thus it is the raising of the float on one side that resets the float to a lowered position on the opposite side.

One important feature of the invention relates to the alternating transfer of suction between the receiving chambers 23 and 24 as the pilot value alternates the vacuum direction through the directional valve 42 for essential continuous flow. As previously stated, the fish/water mixture continues to flow through the valve 142 for some time after the pilot valve 110 has been shifted in direction of the arrow 198 to transfer the suction. This is due to the momentum of the mixture in the hose 12 and the relatively low pressure in the chamber 24 which is gradually increasing. The chamber 24 is essentially sealed except for entry of the decreasing flow of fish/water mixture through the inlet valve 144, which flow finally ceases when momentum and pressure differences are too low to sustain the flow. The flow ceases before the pressure in the chamber 23 and the vacuum circuit is sufficiently low to overcome force from the spring 192 to open the valve 56 as previously described. When the valve member 190 lifts off its seat to expose the chamber 24 to atmosphere there is no flow passing through the inlet valve 144 and then fish from hose 12 will be fed to the chamber 23. The inlet valve 144 of the chamber 24 has an apex similar to the apex 94 of the chamber 23, see FIG. 5. For ease of illustration, the following discription refers to the apex 94 which is associated with the inlet valve 79. Any fish passing upwardly through the duct 27 are forced to pass over the apex 94 of the duct and then to pass downwardly, prior to passing through the inlet valve 79. Thus, if a fish were passing over the apex 94 at the time the flow of mixture ceases, the fish might fall forwardly down the surface 92 and through the inlet valve 79, so as to pass clear into the chamber to permit the valve 79 to close. Alternatively, if the fish stopped prior to passing completely over the apex, it would fall backwardly towards the mixture within the delivery duct 27, or the hose 12. The chances of a fish stopping so as to interfere with closure of the inlet valve is considered to be negligible, in view of the relatively steep slope of the surface 92 of the delivery duct upstream from the inlet valve.

It can be seen that the apex 94 serves as a riser means which is positioned upstream of the inlet valve and is adapted to receive mixture from the duct 27 and to constrain the mixture to move initially upwardly and then downwardly prior to discharging through the inlet valve into the chamber. The riser means is shaped so as to cause solids, such as fish, that might other wise tend to rest adjacent the inlet valve when the mixture flow therethrough ceases, to fall under gravity either forwardly through the inlet valve and into the chamber, or backwardly towards the mixture within the delivery duct. For this to be effective, the inlet valve must be positioned above a predetermined upper level of mixture within the chamber, which upper level is necessarily higher than the predetermined levels 117 or 197 at which stage the float triggers actuation of the pilot valve. The difference in the two levels results from the continuing flow of mixture through the inlet valve due to momentum and pressure differential after the vacuum has been disconnected from the chamber 24. This provides a time delay following disconnection of the vacuum source from the chamber and opening of the respective admitting valve to admit air into the chamber, which opening occurs some time after attaining the predetermined quantity of mixture and the flow has ceased. This time delay also delays closing the inlet valve which provides for solids such as fish to clear the inlet valve before closure thereof. The springs 167 and 192 of the valves 55 and 56 thus serve as resistance means associated with the admitting valve to ensure that the admitting valve admits air into the chamber some time after the directional valve has disconnected the vacuum from the chamber.

It can be seen that the floats 103 and 112, the arms 101 and 114, the links 106 and 115, the arm 108, and the valve 110 serve as alternating means cooperating with the first and second chambers and the main directional valve to actuate the main directional valve so that the chambers are alternately exposed to vacuum so as to provide an essentially continuous means of receiving mixture from the delivery hose and ducts. Also, the connection of the two float assemblies with the links serve as a resetting means to return the quantity sensing means to a position below the position representing a predetermined quantity of liquid prior to the refilling of the chamber. It can be seen that the floats and associated linkages serve as quantity sensing means in each chamber which are interconnected. Thus when the quantity sensing means in one chamber has moved from an essentially empty condition to an essentially full condition, the quantity sensing means of the remaining chamber is moved from an essentially full condition to an essentially empty condition, so as to reset the quantity sensing means of the empty chamber prior to refilling the empty chamber.

It can also be seen that the pilot lines 51, 52, and 132 serve as a portion of a pilot pressure control circuit exposed to the vacuum source or pump 40. The control circuit also has the two-position pilot valve 110 having an input port 137 exposed to vacuum, two output ports 135 and 136 communicating with the respective admitting valves and the directional valve, and the vacuum venting port 138 to admit air to overcome the vacuum as required. It can be seen that the float assembly, serving as quantity sensing means, cooperates with the pilot valve to alternately connect, in a first position thereof as shown, the admitting valve 55 and one portion of the directional valve 42 to vacuum when the quantity sensing means indicates that the chamber 23 contains the predetermined quantity, and, in a second position, not shown, to connect the admitting valve 55 and the opposite portion of the directional valve 42 to admit air.

ALTERNATIVES AND EQUIVALENTS

The invention is shown for use with a pump having twin chambers 23 and 24 which are alternatively exposed to vacuum so as to provide an essentially continuous means of receiving a flow of fish/water mixture through the delivery hose 12. If required, a single receiving chamber embodiment of the invention can be made by eliminating one receiving chamber, ie the second chamber 24. In order to provide a time delay for actuation of the admitting valve for the remaining chamber 23, a reservoir is substituted for the chamber 24, the reservoir communicating with the vacuum source and cooperating with the valve 56 in a manner similar to that of the substituted chamber. The reservoir could be similar to the eliminated receiving chamber, but without inlet and outlet valves, and can be of smaller volume, if air bleed means, such as an adjustable intake valve 201 were fitted to the reservoir. The valve 201 is shown in broken outline in FIG. 6 fitted to the chamber 24 and admits air at a rate as required to delay pressure reduction of the vacuum circuit to delay actuation of the admitting valve 55 of the chamber 23. The float assembly of the chamber 24 would be eliminated, but otherwise the reservoir would be similar to the chamber 24. The quantity sensing means in the remaining chamber 23 is returned to its lowered position by resetting means equivalent to the coupled floats and associated linkages. Operation of the single receiving chamber embodiment is generally similar to that for the two chamber embodiment, except that flow through the delivery duct 12 ceases completely when the inlet valve 79 is closed and the chamber 23 is being emptied. The alternating means cooperates with the chamber, the reservoir and the main directional valve to actuate the directional valve so that the chamber and air reservoir are alternately exposed to vacuum. Alternative quantity sensing means can be substituted for the single or twin chamber embodiments, for example a weight responsive means can be substituted for the volume responsive means as described. Also a presurized air source can be used to raise pressure in the chamber by admitting pressurized air through the admitting valve, thus forcing mixture from the chamber.

The apex 94 and associated upper portion of the duct 27 of the riser means are shown in FIG. 5 to constrain mixture to move initially upwardly over the apex and then downwardly to move generally parallel to the surface 92, prior to discharging through the inlet valve. An alternative riser means can be substituted in which the surface 92 is shortened or essentially eliminated, and the valve seat and valve plate are repositioned closely adjacent the apex 94 so as to be located more closely adjacent the upper end of the duct 27. In this alternative, in which the alternaive valve seat is shown in broken outline in FIG. 5 as 80.1, the riser means, which includes the duct upper portion, constrains the mixture to move upwardly with negligible downward movement prior to discharging through the inlet means. The alternative riser means is so shaped as to cause solids to fall, most probably, backwardly away from the inlet valve. Thus, the alternative location of the inlet valve seat and resulting shape of the riser means is such as to cause solids which might otherwise tend to rest adjacent the inlet valve to clear the inlet valve when flow ceases through the inlet valve.

In summary, the method according to the invention is for handling a solid/liquid mixture comprising solids carried in the liquid, in which the mixture is temporarily stored within at least one chamber communicating with the vacuum source through a main directional valve. The chamber has an inlet valve to receive the mixture, an outlet valve to discharge the mixture, an admitting valve to raise pressure in the chamber, and a quantity sensing means responsive to a predetermined quantity of mixture within the chamber. The method includes the steps of exposing the chamber to the vacuum source to generate a pressure difference across the inlet valve to cause the mixture to move into the chamber. Concurrently the flow of mixture is constrained by a riser means which causes the mixture to move upwardly prior to entering the inlet valve and discharging into the chamber. When the amount of mixture within the chamber contains a predetermined quantity, the vacuum source is disconnected from the chamber so as to decrease the pressure difference across the inlet valve so that flow through the inlet valve ceases and a maximum upper level of mixture within the chamber is below the inlet valve. The admitting valve is opened some time after disconnecting the vacuum source to provide a time delay sufficient to permit any solids coming to rest adjacent the inlet valve when the mixture therethrough ceases, to fall under gravity either forwardly through the inlet valve and into the chamber, or backwardly towards the mixture within the delivery duct. Pressure in the chamber is raised to permit the inlet valve to close and the outlet valve to open to discharge the mixture from the chamber.

The method is further characterized by disconnecting the chamber from the vacuum source when the chamber contains the predetermined quantity of mixture. This is followed by exposing the vacuum source to a reservoir which can be a similar receiving chamber. The reservoir or equivalent provides a large volume which initially reduces pressure differential in the vacuum circuit and additional time is required to reduce pressure sufficiently in the circuit to overcome the resistance to opening of the admitting valve, thus providing the said time delay. The method can be further characterized by storing the mixture temporarily and alternately in at least two receiving chambers, in which each chamber has a respective inlet valve, outlet valve, admitting valve and quantity sensing means. The method is further characterized by actuating the quantity sensing means in the first chamber to indicate that the first chamber contains the predetermined quantity. The vacuum source is disconnected from the first chamber and connected to the second chamber in which the inlet, outlet, and admitting valves of the second chamber are closed so that the second chamber serves as a reservoir containing air initially at a pressure higher than pressure of the vacuum. Clearly, two or more receiving chambers can be connected in parallel as described to provide increased capacity for receiving a fish/water mixture in an essentially continuous stream from the delivery duct.

I claim:

1. An apparatus for handling a solid/liquid mixture comprising solids carried in a liquid, the apparatus having a receiving chamber adapted to receive the mixture from a delivery duct and to hold the mixture temporarily, the chamber communicating with a low air pressure source or a vacuum source through a main directional valve, the chamber having an inlet valve communicating with the delivery duct to receive the mixture, an outlet valve to discharge the mixture from the chamber, an admitting valve to raise pressure in the chamber, and a quantity sensing means responsive to a predetermined quantity of mixture within the chamber, the apparatus being characterized by:
   (a) the inlet valve being positioned adjacent an upper portion of the chamber above a maximum upper level of mixture within the chamber, and the chamber being connectable, as required, to the low pressure source to expose the inlet valve to a pressure difference so as to open the inlet valve and to draw the mixture therethrough,
   (b) a riser means positioned upstream of the inlet valve and adapted to receive and to constrain the mixture to move initially upwardly prior to discharging through the inlet valve into the chamber, the riser means being shaped so as to cause solids, that might other wise tend to rest adjacent the inlet valve when the mixture flow therethrough ceases, to fall under gravity either forwardly through the inlet valve and into the chamber, or backwardly towards the mixture within the delivery duct,
   (c) time delay means reponsive to the quantity sensing means to actuate the main directional valve when the predetermined quantity is attached to disconnect the vacuum source from the chamber, while concurrently permitting the mixture to continue to flow through the inlet valve under a gradually reducing pressure difference, so that flow through the inlet valve eventually ceases at a time when the maximum upper level is attained, prior to opening of the admitting valve to raise pressure in the chamber which closes the inlet valve, so as to provide time for solids to clear the inlet valve before closure thereof.

2. An apparatus as claimed in claim 1 in which the time delay means includes:
   (a) resistance means associated with the admitting valve to ensure that the admitting valve raises pressure in the chamber some time after the directional valve has disconnected the vacuum from the chamber.

3. An apparatus as claimed in claim 1 in which the time delay means is characterized by:
   (a) an air reservoir which is adapted to communicate with the vacuum source through the main directional valve,
   (b) the main directional valve is actuated by low pressure to open essentially freely,
   (c) the admitting valve admits air into the chamber to raise pressure therein and is actuated by low pressure to open against a resistance, which resistance causes the admitting valve to open after the main directional valve means has disconnected the chamber from the vacuum source.

4. An apparatus as claimed in claim 3 further including:
   (a) alternating means cooperating with the chamber, the reservoir and the main directional valve to actuate the main directional valve so that the chamber and the air reservoir are alternately exposed vacuum.

5. An apparatus as claimed in claim 1 further including:
   (a) re-setting means to return the quantity sensing means to a position below a position representing the pre-determined quantity of mixture, prior to the re-filling of the chamber.

6. An apparatus as claimed in claim 1 further including:
   (a) a second receiving chamber adapted to receive the mixture from the delivery duct, the second chamber similarly communicating with the vacuum source through the main directional valve, the second chamber having an inlet valve communicating with a delivery duct to receive the mixture, an outlet valve to discharge the mixture from the second chamber, an admitting valve to raise pressure in the second chamber, and a quantity sensing means responsive to quantity of mixture within the second chamber, the second chamber being adapted to serve as an air reservoir for the time delay means,
   (b) alterating means cooperating with the first and second receiving chambers and the main directional valve to actuate the main directional valve so that the chambers are alternately exposed to vacuum so as to provide an essentially continuous means of receiving mixture from the delivery duct.

7. An apparatus as claimed in claim 6 further including resetting means characterized by:
   (a) the quantity sensing means of each chamber being interconnected so that when the quantity sensing means of one chamber has moved from an essentially empty condition to an essentially full condition, the quantity sensing means of a remaining empty chamber is moved from an essentially full condition to an essentially empty condition, so as to reset the quantity sensing means of the empty chamber prior to refilling the empty chamber.

8. An apparatus as claimed in claim 4 in which the alternating means includes:
   (a) a pilot pressure control circuit exposed to the vacuum source, the control circuit having a two-position pilot valve having an input port exposed to vacuum, two output ports communicating with respective admitting valves and the directional valve, and a vacuum venting port to admit air to overcome the vacuum,
   (b) the quantity sensing means cooperating with the pilot valve to alternately connect, in a first position, the admitting valve and one portion of the directional valve to vacuum when the quantity sensing means indicates that a particular chamber contains the pre-determined quantity, and, in a second position, to connect the admitting valve and the opposite portion of the directional valve to admit air.

9. An apparatus as claimed in claim 8 in which:
   (a) the admitting valve is a spring-closed, pilot-pressure opened, two-way diaphragm spool valve,
   (b) the directional valve is a three-way spool valve, having two seats which are alternately opened and closed when pilot pressure is applied alternately to diaphragms at opposite ends of the spool.

10. An apparatus as claimed in claim 1 in which:
    (a) the riser means is also adapted to constrain the mixture to move downwardly, after the said initial upwards movement, prior to discharging through the inlet valve.

11. A method of handling a solid/liquid mixture comprising solids carried in a liquid, in which the mixture is temporarily stored within a receiving chamber having an inlet valve to receive the mixture, an outlet valve to discharge the mixture, an admitting valve to raise pressure in the chamber, and a quantity sensing means responsive to a predetermined quantity of mixture within the chamber, the method including steps of:
    (a) positioning the inlet valve adjacent an upper portion of the chamber above a maximum upper level of mixture within the chamber,
    (b) exposing the chamber to a vacuum source to generate a pressure difference across the inlet valve to cause the mixture to flow into the chamber, and concurrently constraining the flow of mixture by a riser means which causes the mixture to move upwardly prior to entering the inlet valve and discharging into the chamber,
    (c) sensing when the amount of mixture within the chamber attains the predetermined quantity, and disconnecting the vacuum source from the chamber while permitting continuation of the flow of mixture into the chamber so that the continuing flow gradually decreases the pressure difference across the inlet valve, so that flow of mixture through the inlet valve eventually ceases at a time when a maximum upper level of mixture within the chamber is below the inlet valve,
    (d) opening the admitting valve sometime after disconnecting the vacuum source to provide a time delay sufficient to permit any solids coming to rest adjacent the inlet valve, when the mixture flow therethrough ceases, to fall under gravity either forwardly through the inlet valve and into the chamber, or backwardly towards the mixture within the delivery duct, so as to raise pressure in the chamber to permit the inlet valve to close and the outlet valve to open to discharge the mixture from the chamber.

12. A method as claimed in claim 11 further characterized by:
    (a) after disconnecting the chamber from the vacuum source, connecting to the vacuum source a reservoir to initially reduce pressure differential so that additional time is required to increase pressure differential sufficiently to overcome resistance to opening of the admitting valve, thus providing the said time delay.

13. A method as claimed in claim 11 in which the mixture is temporarily stored alternately in at least two receiving chambers, each chamber having a respective inlet valve to receive the mixture, a respective outlet valve to discharge the mixture, a respective admitting valve to raise pressure in the respective chamber, and a respective quantity sensing means responsive to a predetermined quantity of mixture within the respective chamber, the method being further characterized by:
    (a) actuating the quantity sensing means of the first chamber to indicate that the first chamber contains the predetermined quantity,
    (b) disconnecting the vacuum source from the first chamber and connecting the vacuum source to the second chamber in which the inlet, outlet and admitting valves of the second chamber are closed so that the second chamber serves as a reservoir to reduce pressure differential to an amount which initially is insufficient to overcome resistance to opening of the admitting valve of the first chamber, (c) reducing pressure within the second chamber to an amount to permit opening of the admitting valve chamber, which occurs some time after disconnecting the vacuum to provide the said time delay.

14. A method as claimed in claim 11 further characterized by:

(a) after constraining the mixture to move upwardly by the riser means, constraining the mixture to move downwardly prior to discharge through the inlet valve.

* * * * *

UNITED STATES PATENT AND TRADEMARK OFFICE
CERTIFICATE OF CORRECTION

PATENT NO. : 4,517,099

DATED : 14 May 1985

INVENTOR(S) : Raymond A. Breckner

It is certified that error appears in the above-identified patent and that said Letters Patent are hereby corrected as shown below:

At the top left hand corner of the front of the patent the inventor's last name is shown as "BRACKNER". This should be corrected to

--BRECKNER-- to correspond with the correct recital at item [76].

Signed and Sealed this

Fifteenth Day of October 1985

[SEAL]

Attest:

DONALD J. QUIGG

Attesting Officer

Commissioner of Patents and Trademarks—Designate

UNITED STATES PATENT AND TRADEMARK OFFICE
CERTIFICATE OF CORRECTION

PATENT NO. : 4,517,099

DATED : May 14 1985

INVENTOR(S) : Raymond A. Breckner

It is certified that error appears in the above—identified patent and that said Letters Patent is hereby corrected as shown below:

```
     Column 14, line 34 "attached" should read
--attained--.
```

Signed and Sealed this

Seventeenth Day of June 1986

[SEAL]

Attest:

DONALD J. QUIGG

*Attesting Officer*  *Commissioner of Patents and Trademarks*

REEXAMINATION CERTIFICATE (989th)
United States Patent [19]
Breckner

[11] B1 4,517,099
[45] Certificate Issued Jan. 10, 1989

[54] APPARATUS AND METHOD FOR HANDLING SOLIDS IN LIQUID

[76] Inventor: Raymond A. Breckner, 11360 Granville Ave., Richmond, British Columbia, Canada, V6Y 1R6

Reexamination Request:
No. 90/001,390, Dec. 4, 1987

Reexamination Certificate for:
Patent No.: 4,517,099
Issued: May 14, 1985
Appl. No.: 540,166
Filed: Oct. 7, 1983

Certificate of Correction issued Oct. 15, 1985.

[51] Int. Cl.⁴ .............................. B01D 21/24
[52] U.S. Cl. ........................ 210/741; 210/744; 210/104; 210/124; 210/138; 406/17
[58] Field of Search ............ 210/123, 124, 127–129, 210/104, 105, 138, 169, 241, 744; 43/6.5; 117/3; 15/3.13; 406/16, 17, 168

[56] References Cited
U.S. PATENT DOCUMENTS
1,089,851   3/1914   McNeill .................. 177/61

Primary Examiner—Benoit Castel

[57] ABSTRACT

Apparatus has a receiving chamber subjected to low pressure to receive solid/liquid mixture through inlet valve thereof. The chamber also has outlet valve to discharge the mixture, an admitting valve to raise pressure in the chamber, and quantity sensing structure responsive to predetermined quantity of mixture within the chamber. The inlet valve is positioned above a predetermined upper level of mixture within the chamber, and a riser constrains the mixture to move initially upwardly and then, optionally, downwardly prior to discharging through the inlet valve. The riser is shaped to cause solids that might otherwise tend to rest initially adjacent the inlet valve, when the mixture flow therethrough ceases, to fall under gravity either forwardly through the inlet valve, or backwardly towards mixture within the delivery duct. Time delay structure delays the opening of the admitting valve to raise pressure in the chamber sometime after attaining the predetermined quantity of the mixture, which also delays closing the inlet valve which provides time for solids to clear the inlet valve before closure thereof. The time delay structure uses either a reservoir for a single chamber embodiment, or for a twin chamber embodiment, the remaining chamber serves also as a reservoir. Use of a reservoir or chamber increases the time required for sufficient low pressure to be attained to actuate the admitting valve. Use of twin chambers provides means to receive mixture essentially continuously.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *